(12) United States Patent
Hayashi et al.

(10) Patent No.: US 11,520,549 B2
(45) Date of Patent: Dec. 6, 2022

(54) FACIALLY RESPONSIVE COMMUNICATION APPARATUS

(71) Applicant: HONDA MOTOR CO., LTD., Tokyo (JP)

(72) Inventors: Satoshi Hayashi, Wako (JP); Hiroyuki Sakaguchi, Wako (JP); Ryo Nakayama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 240 days.

(21) Appl. No.: 16/443,925

(22) Filed: Jun. 18, 2019

(65) Prior Publication Data

US 2020/0019362 A1 Jan. 16, 2020

(30) Foreign Application Priority Data

Jul. 13, 2018 (JP) .............................. JP2018-133566

(51) Int. Cl.
| | | |
|---|---|---|
| *G06F 3/14* | (2006.01) | |
| *G06F 3/01* | (2006.01) | |
| *G05D 1/02* | (2020.01) | |
| *G09G 5/37* | (2006.01) | |
| *G09G 5/38* | (2006.01) | |

(52) U.S. Cl.
CPC ............... *G06F 3/14* (2013.01); *G05D 1/021* (2013.01); *G06F 3/017* (2013.01); *G09G 5/37* (2013.01); *G09G 5/38* (2013.01)

(58) Field of Classification Search
None
See application file for complete search history.

(56) References Cited

U.S. PATENT DOCUMENTS

| | | | | |
|---|---|---|---|---|
| 2008/0147261 | A1* | 6/2008 | Ichinose | ............. G01C 22/006 701/24 |
| 2014/0277847 | A1* | 9/2014 | Cann | ....................... B60L 53/14 701/2 |

(Continued)

FOREIGN PATENT DOCUMENTS

| | | |
|---|---|---|
| JP | 10-289006 | 10/1998 |
| JP | 2001-215940 | 8/2001 |

(Continued)

OTHER PUBLICATIONS

Men et al.; "A Common Framework for Interactive Texture Transfer;" 2018 IEEE/CVF Conference on Computer Vision and Pattern Recognition, Jun. 18-23, 2018, pp. 6353-6362 (Year: 2018).*

(Continued)

*Primary Examiner* — Edward Martello
(74) *Attorney, Agent, or Firm* — Amin, Turocy & Watson, LLP

(57) ABSTRACT

A communication apparatus includes a display part, a display output part, and a control part. A plurality of face patterns are switched and displayed on the display part. The display output part is capable of outputting a face pattern to the display part. The control part controls, in accordance with a change of the face pattern which is output by the display output part, a different operation of a communication apparatus main body than the change of the face pattern.

18 Claims, 10 Drawing Sheets

(56) References Cited

U.S. PATENT DOCUMENTS

| | | | | |
|---|---|---|---|---|
| 2015/0032254 A1* | 1/2015 | Ishiguro | ............... | B25J 9/1602 700/245 |
| 2015/0336276 A1* | 11/2015 | Song | ................ | B25J 9/0003 901/1 |
| 2017/0242478 A1* | 8/2017 | Ma | ................ | H04N 9/3147 |
| 2018/0154273 A1* | 6/2018 | Kou | ................ | B25J 11/0005 |
| 2018/0154514 A1* | 6/2018 | Angle | ................ | G16H 20/13 |
| 2018/0229370 A1* | 8/2018 | Florencio | ............... | B25J 9/1694 |
| 2019/0342243 A1* | 11/2019 | Lee | ................ | H04L 51/10 |
| 2020/0361078 A1* | 11/2020 | Kato | ................ | B25J 9/161 |

FOREIGN PATENT DOCUMENTS

| | | |
|---|---|---|
| JP | 2001-300876 | 10/2001 |
| JP | 2001-327765 | 11/2001 |
| JP | 2002-307354 | 10/2002 |
| JP | 2009-509673 | 3/2009 |
| JP | 2014-211704 | 11/2014 |
| JP | 2016-193466 | 11/2016 |
| JP | 2017-064862 | 4/2017 |
| JP | 2018-055387 | 4/2018 |
| JP | 2018-061718 | 4/2018 |

OTHER PUBLICATIONS

Farhidi et al.; "Every Picture Tells a Story: Generating Sentences from Images;" ECCV 2010, Part IV, LNCS 6314, pp. 15-29, 2010; Springer-Verlag Berlin Heidelberg (Year: 2010).*

Yang et al.; "Context-Aware Unsupervised Text Stylization;" In 2018 ACM Multimedia Conference (MM '18), Oct. 22-26, 2018, Seoul, Republic of Korea. ACM, New York, NY, USA, 9 pages (Year: 2018).*

Toshihiro Nakahashi, What types of "movable communication robots" are there? Representative examples were summarized, Robostart [online], Sep. 15, 2016, [retrieved on Apr. 6, 2020], URL, https://robotstart.info/2016/09/15/movable-communication-robots.html.

Toshihiro Nakahashi, Plentiful facial expressions! Communication robots having facial display, Robostart [online], Sep. 14, 2016, [retrieved on Apr. 6, 2020], URL, https://robotstart.info/2016/09/14/screen-face-communication-robots.html.

Yoji Kanzaki, Hitachi exhibits a bulb-type communication robot that is close to the elderly. Non-verbal touching of the heart is also emphasized. Robostart [online], Oct. 2, 2017, [retrieved on Apr. 6, 2020], URL, https://robotstart.info/2017/10/02/ceatec-hitachi.html.

Japanese Office Action for Japanese Patent Application No. 2018-133566 dated May 12, 2020.

* cited by examiner

FACIALLY RESPONSIVE COMMUNICATION APPARATUS

CROSS-REFERENCE TO RELATED APPLICATION

Priority is claimed on Japanese Patent Application No. 2018-133566, filed on Jul. 13, 2018, the contents of which are incorporated herein by reference.

BACKGROUND

Field of the Invention

The present invention relates to a communication apparatus and a communication apparatus operation method.

Background

Recently, a communication apparatus that has a robot shape and that communicates with a person has been proposed (for example, refer to Japanese Unexamined Patent Application, First Publication No. 2018-061718).

The communication apparatus described in Japanese Unexamined Patent Application, First Publication No. 2018-061718 has a face that has a definite shape and that resembles a person or an animal, and a pair of eye portions are arranged on the face part. An arbitrary one of a plurality of designed drawing patterns is selected and is projected on the eye portion.

SUMMARY

However, in the communication apparatus described in Japanese Unexamined Patent Application, First Publication No. 2018-061718, only the expression of the eye portion is changed by the switching of the projected drawing patterns, and therefore, the reaction of the communication apparatus is relatively monotonous. Therefore, a communication apparatus capable of presenting a wider array of changes of expressions to a neighbor is currently desired.

An aspect of the present invention provides a communication apparatus and a communication apparatus operation method capable of presenting a wider array of changes of expressions to a neighbor.

A communication apparatus according to an aspect of the present invention includes: a display part on which a plurality of face patterns are switched and displayed; a display output part that is capable of outputting a face pattern to the display part; and a control part that controls, in accordance with a change of the face pattern which is output by the display output part, a different operation of a communication apparatus main body than the change of the face pattern.

According to the above configuration, for example, when there is a predetermined trigger (when a predetermined condition is satisfied) or the like, not only the change of the face pattern but also the different operation of the communication apparatus main body are controlled in accordance with the change of the face pattern. As a result, the range of reactions of the communication apparatus main body increases, and it becomes possible to present a wide array of changes of expressions to a neighbor.

The communication apparatus may further include a movement device that moves the communication apparatus main body, wherein the control part may control the display output part and the movement device, and the control part may control the display output part such that when the communication apparatus main body is moved by the movement device, a face pattern that suggests a movement among the plurality of face patterns is displayed on the display part.

In this case, before the communication apparatus main body moves, when the communication apparatus main body moves, or the like, the face pattern of the communication apparatus main body suggests the start of the movement, a movement direction, and the like of the communication apparatus main body. Therefore, it becomes possible to alert a neighbor that the communication apparatus main body starts the movement and to allow the neighbor to know the movement direction.

When the display output part allows the display part to display a face pattern that suggests a movement direction, the control part may control the movement device such that the communication apparatus main body moves in the direction that is suggested by the face pattern.

In this case, the face pattern suggests the direction in which the communication apparatus main body moves from now, and therefore, it becomes possible to alert a neighbor person and a person who is present in a proceeding direction of the communication apparatus main body and to allow them to know the proceeding direction.

The communication apparatus main body may have a head part above the movement device, and when the communication apparatus main body is moved in the direction that is suggested by the face pattern, the control part may tilt the head part downward in the movement direction of the communication apparatus main body and then move the communication apparatus main body.

In this case, by the tilt of the head part in addition to the face pattern, it is possible to allow a neighbor to know the start of the movement and the movement direction of the communication apparatus main body.

The control part may control the display output part such that after there is a predetermined trigger, the face pattern that is displayed on the display part is changed to a character or a symbol.

In this case, when there is a predetermined trigger to the communication apparatus, after that, the display of the display part is changed from the face pattern to the character or the symbol. At this time, a part at which the face pattern is displayed easily catches a neighbor person's eye. The part that catches the person's eye is changed from the face pattern to the character or the symbol, and thereby, it becomes easy to communicate the intention which the communication apparatus wants to express to the neighbor person.

The control part may control the display output part such that after there is a predetermined trigger, the face pattern that is displayed on the display part is continuously changed to a shape of a character or a symbol.

In this case, the display of the display part is continuously changed from the face pattern to the shape of the character or the symbol, and thereby, it becomes easy to attract further attention from the neighbor.

The communication apparatus may further include a peripheral situation acquisition part that acquires a peripheral situation of the communication apparatus main body, wherein the control part may control the display output part using the peripheral situation acquisition part acquiring information indicating that a person is present in the vicinity as the predetermined trigger.

In this case, when a person is present around the communication apparatus main body, it is possible to change the display of the display part from the face pattern to the character or the symbol. Therefore, it is possible to favorably communicate the intention which the communication apparatus wants to express to the neighbor person.

The communication apparatus may further include a motion detection part that detects a motion of a person with respect to the communication apparatus main body, wherein the control part may control the display output part using the motion detection part detecting a predetermined motion of a person with respect to the communication apparatus main body as the predetermined trigger.

In this case, when a person performs a predetermined motion such as waving his/her hand toward the communication apparatus main body, the motion detection part detects that the person performs the predetermined motion toward the communication apparatus main body. At this time, the control part changes the display of the display part from the face pattern to the character or the symbol. Therefore, it is possible to favorably communicate the intention which the communication apparatus wants to express, to the person who performs the predetermined motion to the communication apparatus main body.

The communication apparatus may include: a motion detection part that detects a motion of a person with respect to the communication apparatus main body; and an illumination part that illuminates a region which includes the display part of the communication apparatus main body, wherein the control part may change a display of the face pattern to light emission of the illumination part using the motion detection part detecting a predetermined motion of a person with respect to the communication apparatus main body as a trigger.

When the display of the face pattern continues for a long time, a neighbor person may have a feeling of being seen. For example, in such a case, the person performs a predetermined motion that becomes a trigger with respect to the communication apparatus. Thereby, in the communication apparatus main body, the display of the face pattern is changed to the light emission of the illumination part. As a result, the communication apparatus enables the light of the illumination part to blend with the peripheral space as one of interior accessories.

The control part may control the display output part such that a shape of a boundary line of the face pattern is changed in a wave form at a first frequency.

In this case, the boundary line of the face pattern is changed continuously in a wave form, and therefore, it is possible to allow a neighbor person to evoke that the communication apparatus is a communication target.

The communication apparatus may include a movement device that moves the communication apparatus main body, wherein the control part may control the movement device such that the communication apparatus main body vibrates or moves at a second frequency.

In this case, the communication apparatus main body periodically and continuously moves, and therefore, it is possible to allow a neighbor person to evoke that the communication apparatus is a communication target.

The communication apparatus may include a movement device that moves the communication apparatus main body, wherein the control part may control the movement device such that the communication apparatus main body vibrates or moves at a second frequency together with a shape change in the wave form of the boundary line of the face pattern.

In this case, the communication apparatus main body periodically and continuously moves while the boundary line of the face pattern is changed continuously in a wave form, and therefore, it is possible to allow a neighbor person to further strongly evoke that the communication apparatus is a communication target.

The second frequency may be set to be lower than the first frequency.

In this case, the periodic motion of the communication apparatus main body becomes slower than the motion of the boundary line of the face, and therefore, it is possible to prevent a neighbor person from being irritated.

The control part may control the display output part such that a display position of the face pattern in the display part is moved at a predetermined condition.

In this case, it is possible to show as if the communication apparatus main body moves the head part to a neighbor without moving the head part of the communication apparatus main body. Accordingly, when the present configuration is employed, it is possible to allow the communication apparatus to perform a variety of motions in appearance while simplifying the system.

A communication apparatus operation method according to another aspect of the present invention includes: displaying one of a plurality of face patterns on a display part of a communication apparatus main body; and in accordance with a change of the face pattern, performing a different operation of the communication apparatus main body than the face pattern.

The communication apparatus operation method may display a face pattern that suggests a movement on the display part when the communication apparatus main body is moved.

The communication apparatus operation method may change a display of the display part from the face pattern to a character or a symbol when there is a predetermined trigger.

According to an aspect of the present invention, not only the change of the face pattern but also another operation of the communication apparatus main body are controlled in accordance with the change of the face pattern, and therefore, it is possible to present a wider array of changes of expressions to a neighbor.

DESCRIPTION OF THE EMBODIMENTS

Hereinafter, an embodiment of the present invention will be described with reference to the drawings.

Figure 1:
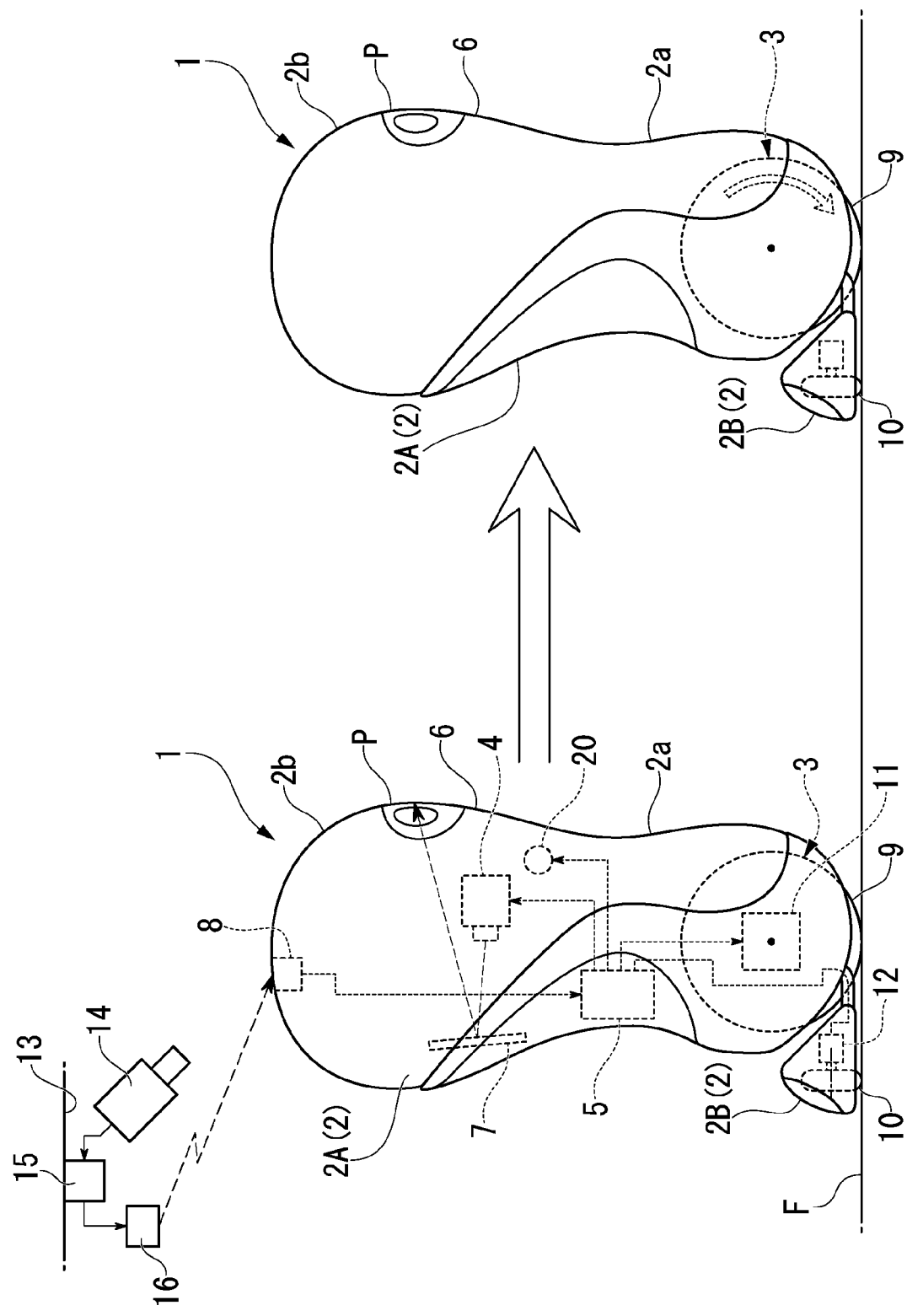
FIG. 1 is a schematic configuration view of a communication apparatus when seen from a side direction according to an embodiment of the present invention.
Figure 2:
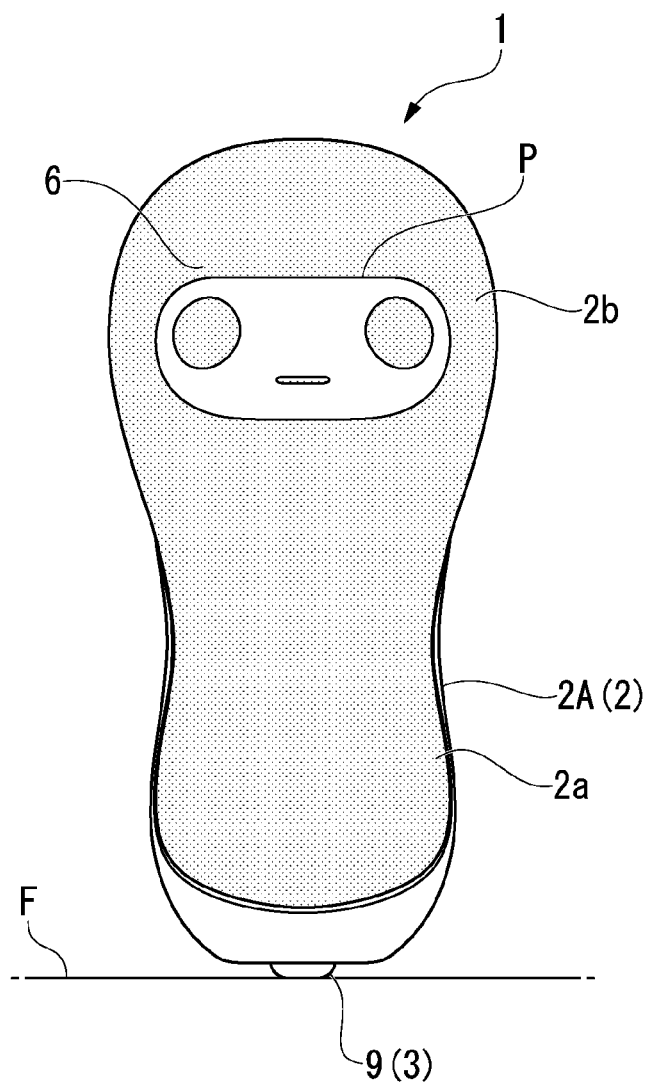
FIG. 2 is a front view of the communication apparatus according to the embodiment.

FIG. 1 is a schematic configuration view of a communication apparatus 1 of the embodiment when seen from a right side direction. FIG. 2 is a front view of the communication apparatus 1.

The communication apparatus 1 has a housing 2 of a doll type. A movement device 3, a projector 4 as a display output part, a controller 5 as a control part, and the like are stored inside the housing 2.

The housing 2 includes a housing main body 2A that has a torso part 2a and a head part 2b and that has an ellipsoidal shape and a tail part 2B that is connected swingably upward and downward to an outer surface close to a lower end of the housing main body 2A. In the following description, for ease of understanding, a side of the housing main body 2A to which the tail part 2B is connected is referred to as a "rear", and a side opposite to the side to which the tail part 2B is connected is referred to as a "front".

At least the head part 2b of the housing main body 2A is formed of a colored resin having optical transparency. A front wall surface of the head part 2b is a display part 6 on which a pattern image by the projector 4 is projected from the inside. The display part 6 is not limited to the front wall surface of the head part 2b and may be an entire surface of the circumference of the head part 2b.

The projector 4 that projects output light that includes the pattern image rearward, a reflection mirror 7 that reflects the output light of the projector 4 frontward toward the display part 6, the controller 5 that controls the projector 4, a receiver 8 that receives a signal from the outside and that outputs the signal to the controller 5, and a lighting body 20 (illumination part) that emits light by power distribution and that illuminates the entire head part 2b from the inside are accommodated inside the housing main body 2A.

The projector 4 receives a command from the controller 5 and outputs an arbitrary pattern image. A basic of the output pattern image is a face pattern P that resembles a human face as shown in FIG. 2. The face pattern P that is output by the projector 4 can be changed, for example, from a basic pattern P shown in FIG. 2 continuously to a variety of expressions that indicate delight, anger, sorrow, and pleasure as shown in FIGS. 3A to 3F. It is also possible to output a character, a symbol, and the like other than the face pattern P from the projector 4. It is possible to move a projection position of the face pattern P, the character, the symbol, and the like on the display part 6 upward, downward, rightward, leftward, or the like by the control of the projector 4 by the controller 5.

The movement device 3 that is embedded in the communication apparatus 1 includes a large diameter wheel 9 that is arranged on a lower part of the housing main body 2A and that is used for a translation movement, a small diameter wheel 10 that is arranged on the tail part 2B and that is used for a rotation movement, an actuator 11 that drives the large diameter wheel 9 such as an electric motor, and an actuator 12 that drives the small diameter wheel 10 such as an electric motor. The communication apparatus 1 is in contact with a floor surface F using the large diameter wheel 9 and the small diameter wheel 10.

In the large diameter wheel 9 that is used for a translation movement, an annular elastic body having a circular shape in a cross-section is held by a rim part of a wheel main body. The wheel main body is rotatable around a wheel axis along a right-to-left direction (a direction orthogonal to a vertical direction and a front-to-rear direction) of the communication apparatus 1. The annular elastic body is rotatable around a cross-section center (more specifically, a circumferential line that passes through a cross-section center of the circular shape and that has the same center as the wheel axis of the wheel main body) of the annular elastic body on an outer circumference of the rim part of the wheel main body. The large diameter wheel 9 is able to allow the communication apparatus 1 to perform a translation movement in an arbitrary direction (front-to-rear, right-to-left, and diagonal directions) by the combination of a rotation around the wheel axis of the wheel main body and a rotation of the annular elastic body.

The actuator 11 is described as a single block in FIG. 1 but has an actuator part that drives and rotates the wheel main body of the large diameter wheel 9 and an actuator part that drives and rotates the annular elastic body. The actuator 11 is able to rotate each of the annular elastic body and the wheel main body of the large diameter wheel 9 forward and reversely at an arbitrary speed.

The small diameter wheel 10 that is used for a rotation movement is arranged such that the wheel axis is directed along the front-to-rear direction of the communication apparatus 1. The small diameter wheel 10 is in contact with the floor surface F at a position that is separated rearward with respect to a ground contact part of the large diameter wheel 9. The small diameter wheel 10 is able to rotate the communication apparatus 1 by rotating at the position that is separated from the ground contact part of the large diameter wheel 9. The actuator 12 is able to rotate the small diameter wheel 10 forward and reversely at an arbitrary speed.

The configuration of the movement device 3 is not limited to the configuration described above, and a movement device having another configuration can be employed.

The controller 5 drives the actuators 11, 12 depending on a condition of an input signal and the like and thereby controls the translation movement, the rotation movement, an attitude, and the like of the communication apparatus 1.

An attitude control of the communication apparatus 1 by the controller 5 is described.

In the communication apparatus 1 of the present embodiment, a main ground contact part with respect to the floor surface is a very narrow region at a lower end of the large diameter wheel 9, and a center of gravity of the communication apparatus main body (hereinafter, referred to as an "apparatus main body") is located at an upper position of a lower end of the large diameter wheel 9. The communication apparatus 1 constitutes an inverted pendulum in which the center of gravity of the apparatus main body is located at an upper position of a fulcrum point (the lower end of the large diameter wheel 9).

The controller 5 controls the actuator 11 such that the position of the fulcrum point is moved to a position directly below the center of gravity when the position of the center of gravity of the apparatus main body of the communication apparatus 1 is displaced from a position directly above the fulcrum point (the lower end of the large diameter wheel 9).

The communication apparatus 1 includes a tilt sensor (not shown) for measuring a tilt angle of a predetermined region of the apparatus main body relative to a vertical direction and a change speed of the tilt angle. The controller 5 receives a signal from the tilt sensor and performs a feedback control of the actuator 11 such that a displacement of the center of gravity of the apparatus main body (the displacement of the center of gravity relative to a center of gravity in a standing attitude) approaches zero. Therefore, when the apparatus main body is tilted and is likely to fall due to some reasons, the attitude of the communication apparatus 1 is automatically recovered by the control of the actuator 11 by the controller 5.

The communication apparatus 1 performs a variety of operations in accordance with the presence or absence of a person and a motion of a person. In the communication apparatus 1, the presence or absence of a person is acquired from a peripheral situation acquisition part, and a situation of the motion of a person is detected by a motion detection part. The peripheral situation acquisition part and the motion detection part can be also provided on the apparatus main body of the communication apparatus 1; however, in the case of the present embodiment, the peripheral situation acquisition part and the motion detection part are provided outside the apparatus main body.

Specifically, the peripheral situation acquisition part and the motion detection part are constituted of an imaging apparatus 14 that is provided on a ceiling 13 of a facility, a wall surface, and the like and an analysis apparatus 15 that analyzes the presence or absence of a person and the motion of a person on the basis of image information that is captured by the imaging apparatus 14. The imaging apparatus 14 captures an image of the apparatus main body of the communication apparatus 1 and the peripheral situation of the apparatus main body. An analysis result by the analysis apparatus 15 is transmitted to the apparatus main body of the communication apparatus 1 via a transmitter 16. The analysis result that is transmitted to the apparatus main body from the transmitter 16 is input to the controller 5 inside the apparatus main body via the receiver 8. The controller 5 controls the projector 4 and the movement device 3 in accordance with the input analysis result.

The controller 5 changes the face pattern P that is displayed on the display part 6 (head part) of the housing 2 in accordance with the signal that is transmitted from the external analysis apparatus 15 and displays a character or a symbol on the display part 6 or moves the communication apparatus 1 in a predetermined direction in accordance with the change of the pattern P.

Figure 4:
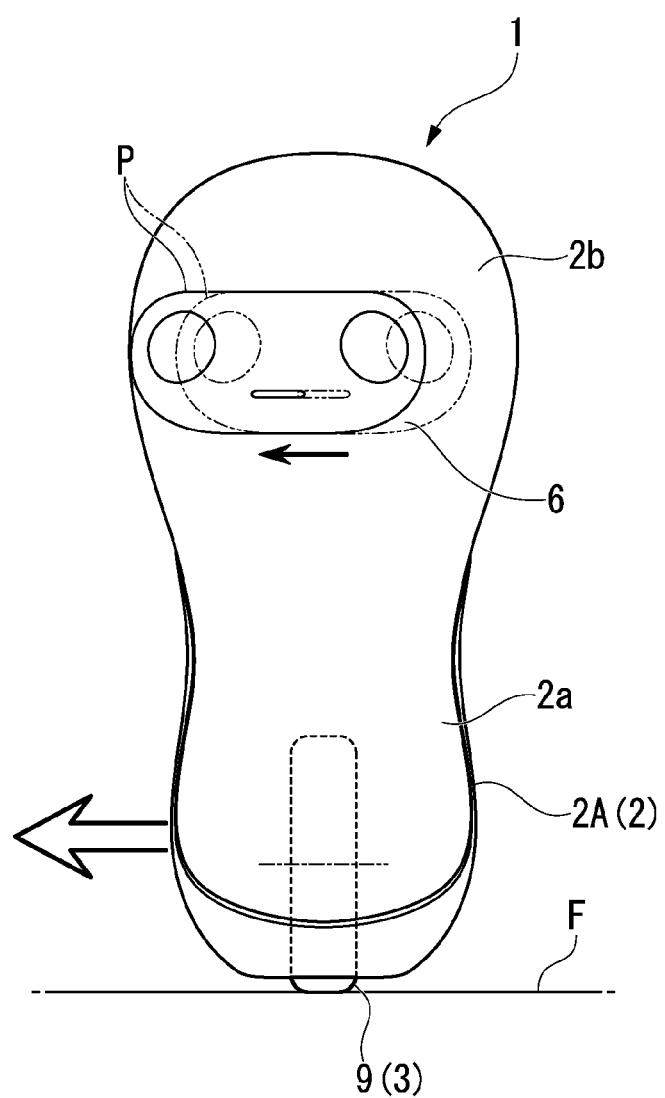
FIG. 4 is a front view describing an operation of the communication apparatus according to the embodiment.

FIG. 4 is a view showing a behavior of the communication apparatus 1 when receiving a predetermined signal from the analysis apparatus 15 and starting a movement in a side direction.

For example, when a neighbor person beckons to the communication apparatus 1, waves his/her hand, or the like, and information indicating the motion is input to the controller 5 from the analysis apparatus 15 (when there is a trigger), the controller 5 moves the face pattern P to a movement direction (a direction toward the person performing the motion such as the beckoning) and then moves the apparatus main body of the communication apparatus 1 to a target direction. Thereby, the neighbor person is able to know the movement direction of the apparatus main body before the communication apparatus 1 starts the movement.

In this example, the communication apparatus 1 moves the entire face pattern P to the movement direction in advance before the communication apparatus 1 starts the movement; however, the communication apparatus 1 may move only part (for example, an eye) of the pattern in place of moving the entire face pattern P.

Figure 5A:
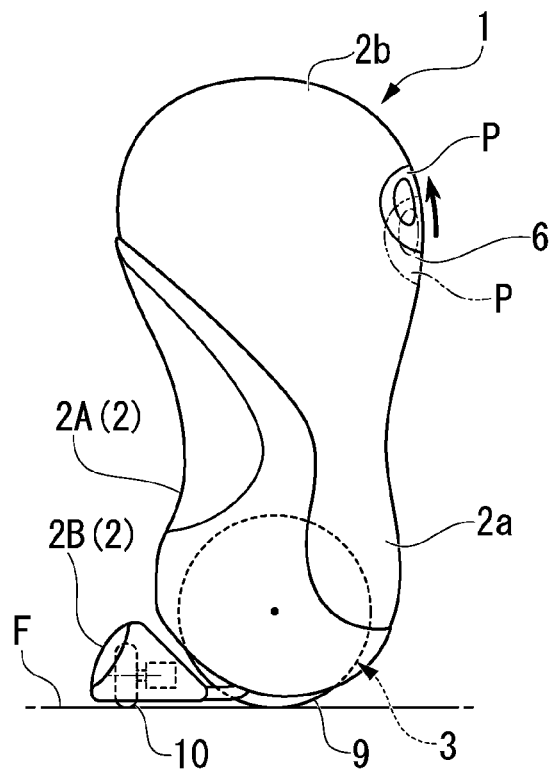
FIG. 5A is a view describing an operation of the communication apparatus when seen from a side direction according to the embodiment.
Figure 5B:
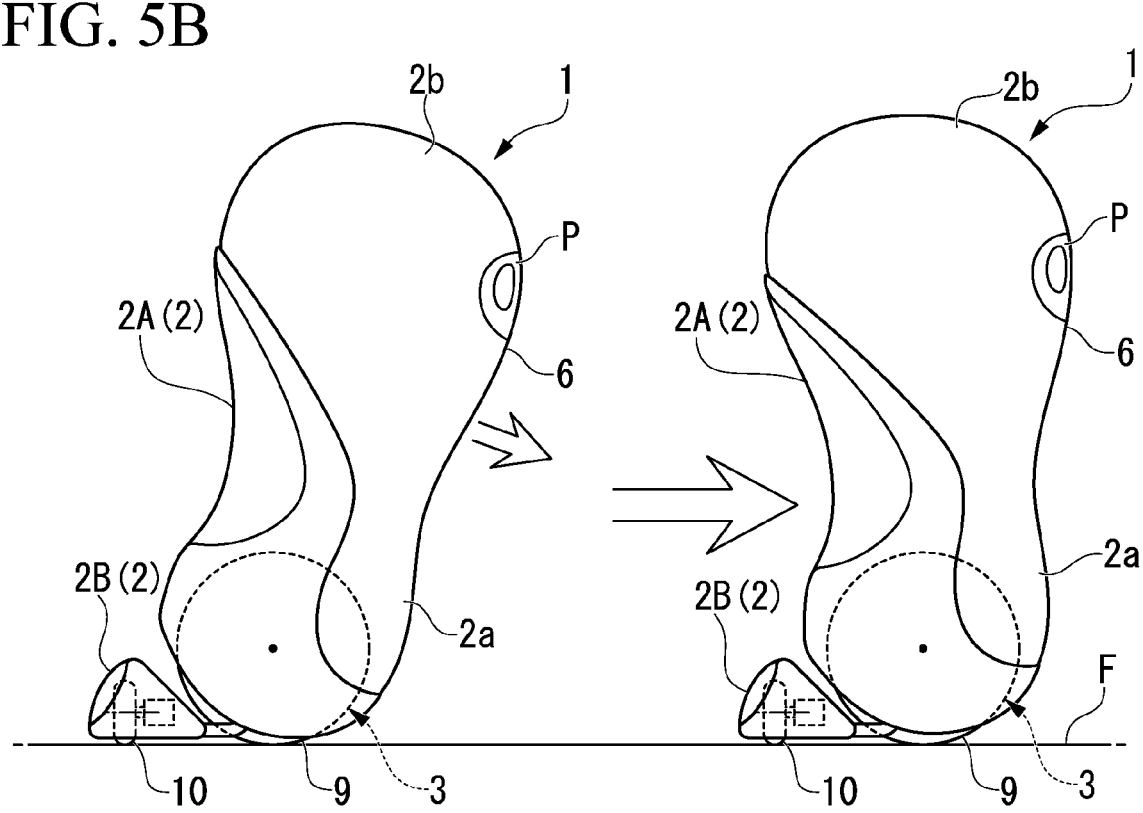
FIG. 5B is a view describing an operation of the communication apparatus when seen from a side direction according to the embodiment.

FIGS. 5A, 5B are views showing a behavior of the communication apparatus 1 when receiving a predetermined signal from the analysis apparatus 15 and starting a movement in a frontward direction.

For example, when information of a motion of a neighbor person such as beckoning is input from the analysis apparatus 15 to the controller 5 (when there is a trigger), the controller 5 moves the face pattern to a direction (for example, an upward direction) that suggests a movement direction (refer to FIG. 5A) and then moves the apparatus main body of the communication apparatus 1 forward (refer to FIG. 5B).

When moving the apparatus main body of the communication apparatus 1 forward, as shown in FIG. 5B, the head part 2b of the housing 2 may be tilted frontward in the proceeding direction immediately before the forward movement. Thereby, by the operation of the head part 2b of the housing 2, it is possible to allow a neighbor to understand the movement direction.

It is possible to perform the frontward tilting of the head part 2b of the housing 2 by the control of the actuator 11 by the controller 5.

FIGS. 6A to 6D are views schematically showing a principle by which the head part 2b of the communication apparatus 1 tilts frontward by the control of the actuator 11.

Figure 6A:
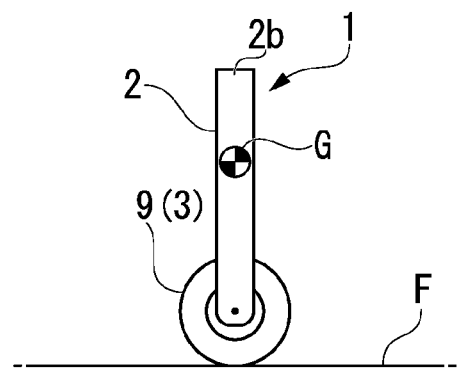
FIG. 6A is a schematic view describing an operation of the communication apparatus according to the embodiment.
Figure 6B:
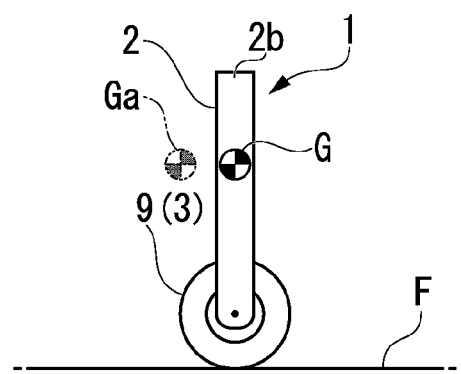
FIG. 6B is a schematic view describing an operation of the communication apparatus according to the embodiment.

A reference numeral G in FIGS. 6A to 6D is an actual center of gravity of the communication apparatus 1, and a reference numeral Ga is a virtual center of gravity that is set when the controller 5 calculates a control target value. FIG. 6A shows a state in which the communication apparatus 1 does not tilt frontward and remains still. In this state, the center of gravity G of the communication apparatus 1 is positioned directly above the ground contact part of the large diameter wheel 9.

Figure 6C:
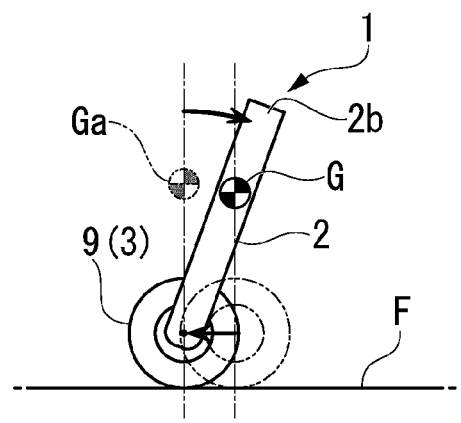
FIG. 6C is a schematic view describing an operation of the communication apparatus according to the embodiment.

From the state of FIG. 6A, when tilting the head part 2b frontward in a right direction in FIGS. 6A to 6D, the controller 5 (calculation part) sets a virtual center of gravity Ga at a more rearward position by a predetermined amount than the position of the actual center of gravity G (refer to FIG. 6B), the large diameter wheel 9 is rotated in a backward direction such that the displacement of the center of gravity (the displacement of the center of gravity with respect to a center of gravity in a standing attitude) of a virtual apparatus that has the virtual center of gravity Ga and that is in contact with the ground at the same position as the actual large diameter wheel 9 approaches zero. As a result, the head part 2b of the housing 2 of the actual communication apparatus 1 tilts frontward as shown in FIG. 6C.

Figure 6D:
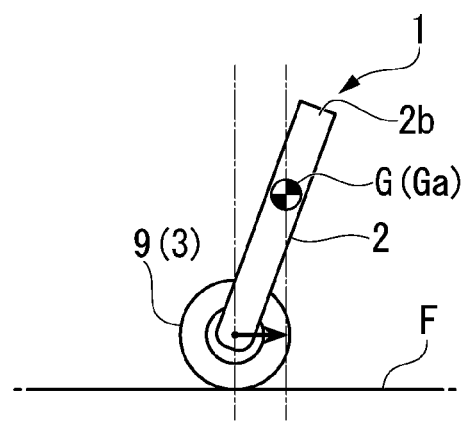
FIG. 6D is a schematic view describing an operation of the communication apparatus according to the embodiment.

Next, from this state, the controller 5 rotates the large diameter wheel 9 in the proceeding direction. As a result, as shown in FIG. 6D, the communication apparatus 1 moves forward in a target direction and gradually returns to the original standing attitude from the frontward tilting attitude.

FIGS. 7A to 7D are views showing a state in which a predetermined signal is received from the analysis apparatus 15, the face pattern P that is displayed on the display part 6 of the housing 2 is gradually changed, and eventually, a predetermined character such as "Hello" is displayed on the display part 6.

Figure 7A:
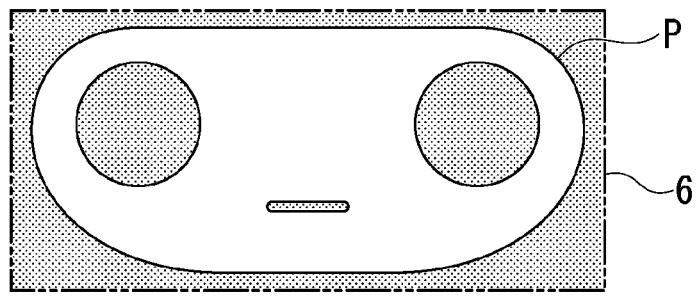
FIG. 7A is a view describing a display change of a display part of the communication apparatus according to the embodiment.
Figure 7B:
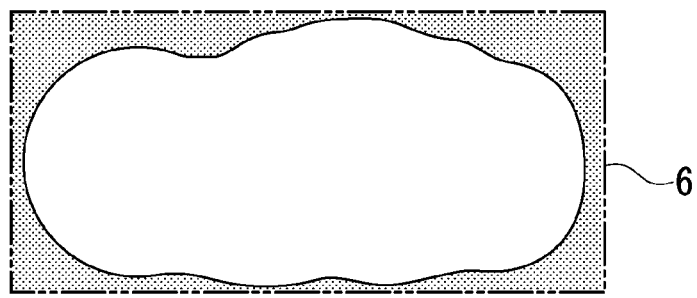
FIG. 7B is a view describing a display change of the display part of the communication apparatus according to the embodiment.
Figure 7C:
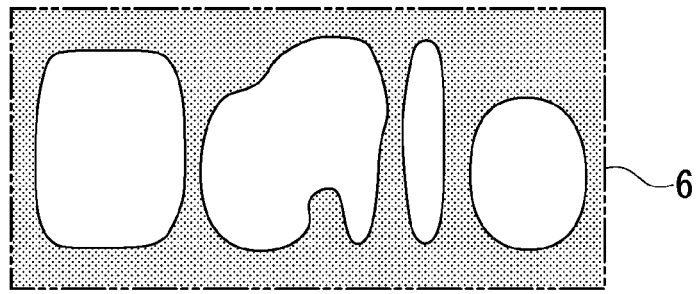
FIG. 7C is a view describing a display change of the display part of the communication apparatus according to the embodiment.
Figure 7D:
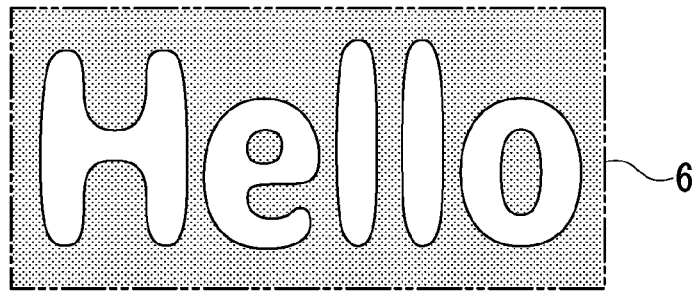
FIG. 7D is a view describing a display change of the display part of the communication apparatus according to the embodiment.

For example, when information of a motion of a neighbor person such as beckoning is input from the analysis apparatus 15 to the controller 5 (when there is a trigger), the controller 5 deforms the basic face pattern P (refer to FIG. 7A) to a single lump having a cloud shape (refer to FIG. 7B), then divides the single lump into a plurality of lumps in accordance with the arrangement of characters as shown in FIG. 7C, and eventually, displays the predetermined character such as "Hello" as shown in FIG. 7D.

Figure 8:
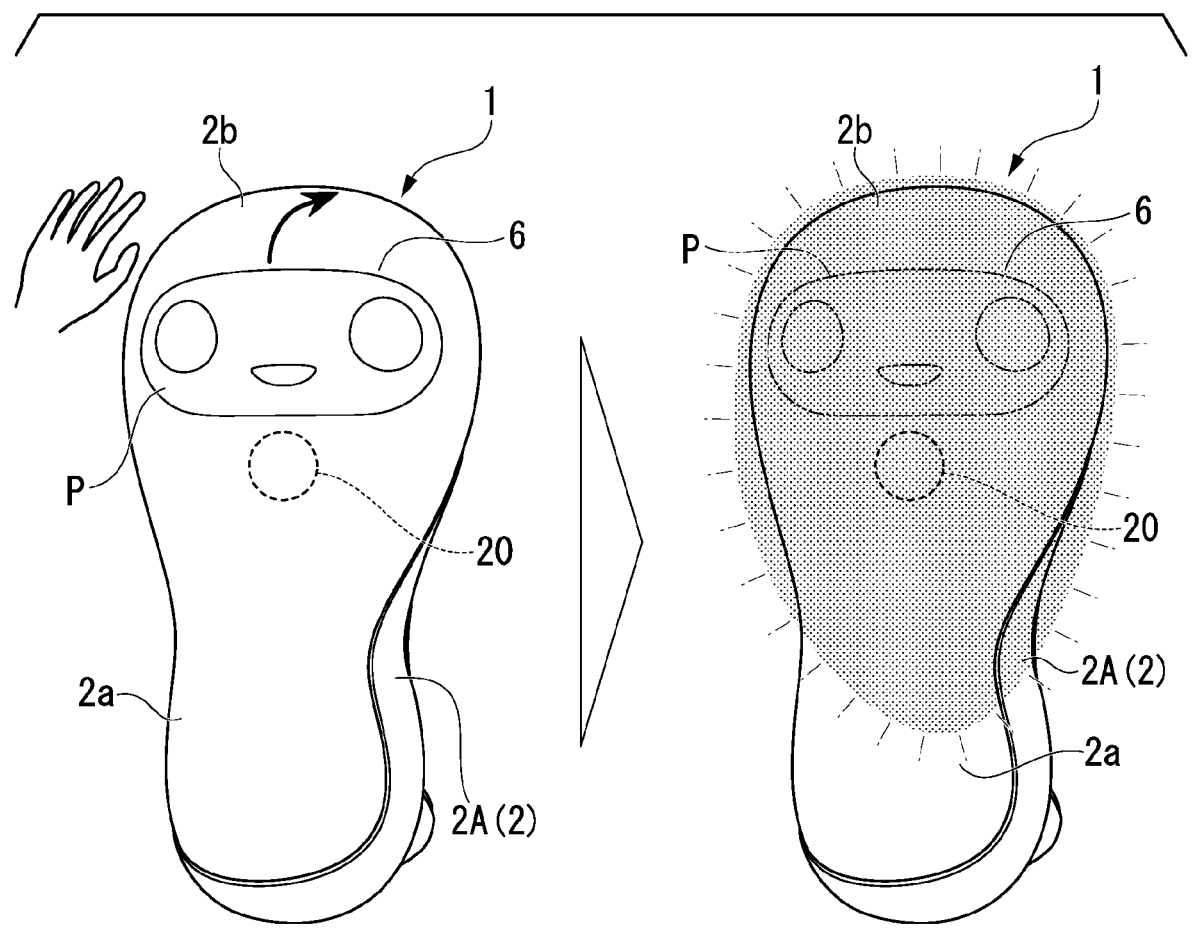
FIG. 8 is a view describing an operation of the communication apparatus according to the embodiment.

FIG. 8 is a view showing a state in which a predetermined signal is received from the analysis apparatus 15, the face pattern P that is displayed on the display part 6 of the housing 2 disappears, and the lighting body 20 is turned on instead of the face pattern P.

For example, when a person performs an operation of stroking the head part 2b of the communication apparatus 1 by hand, the operation of stroking is analyzed by the analysis apparatus 15, and information of the operation of stroking is input from the analysis apparatus 15 to the controller 5. At this time, the controller 5 stops the display of a pattern by the projector 4 and turns on the lighting body 20 instead of the display of the pattern. As a result, the head part 2b of the communication apparatus 1 lights from the inside by the turning on of the lighting body 20 and illuminates the surroundings like illumination.

In FIG. 8, only one lighting body 20 is provided inside the housing 2; however, a plurality of lighting bodies 20 may be provided inside and on a surface of the housing 2.

Figure 9:
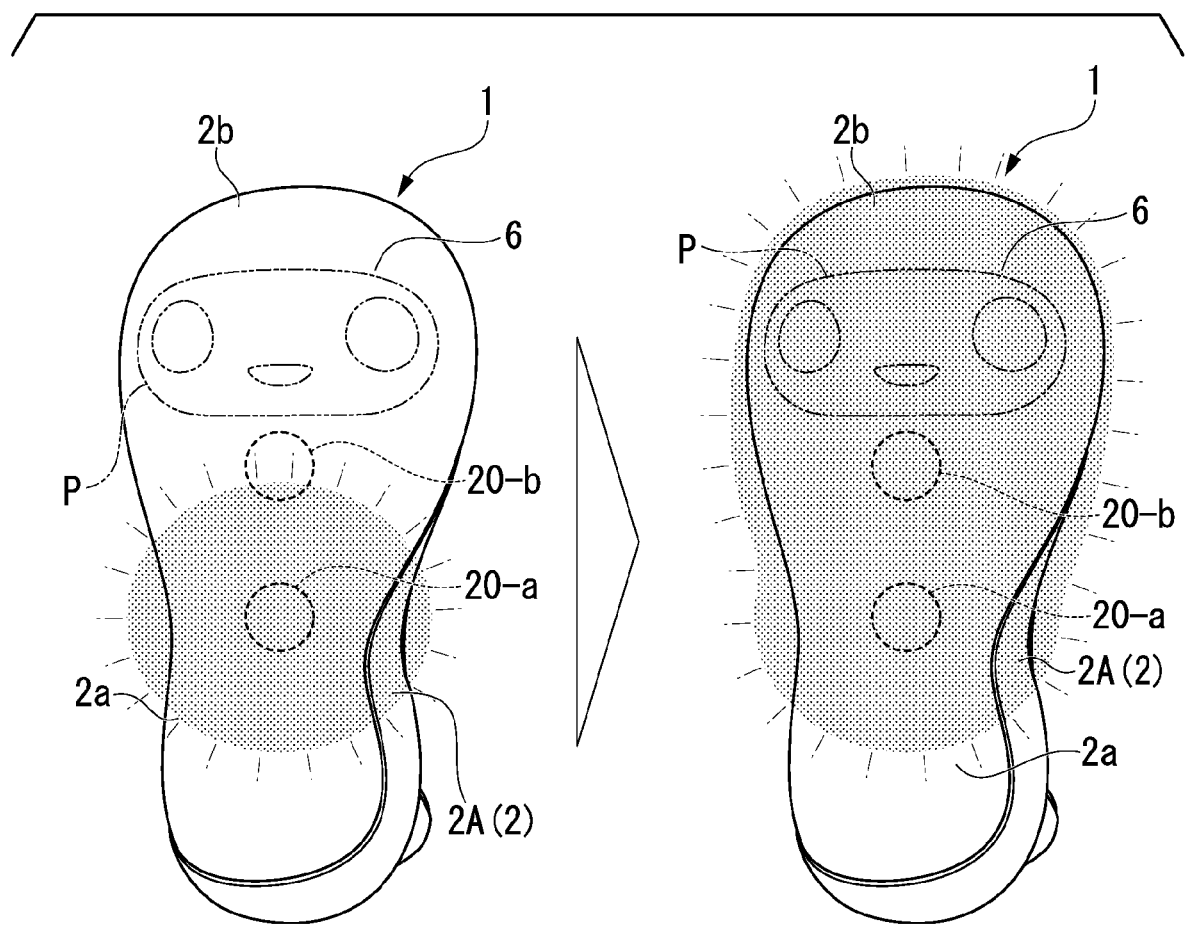
FIG. 9 is a view describing an operation of the communication apparatus according to a modified example of the embodiment.

FIG. 9 is a view showing a modified example in which two lighting bodies 20-a, 20-b are arranged at positions separated in the vertical direction inside the housing 2, and the turning on of each of the lighting bodies 20-a, 20-b is changed with a time interval. In the case of the modified example, the two lighting bodies 20-a, 20-b are arranged to be separated in the vertical direction of the housing 2; however, a plurality of lighting bodies may be further provided to be separated in the vertical direction and the right-to-left direction of the housing. In this case, the lighting bodies are sequentially turned on with a time difference as if light flows from a lower part to an upper part, from an upper part to a lower part, or from left to right, and it is also possible to allow the illumination to have a motion of gradation.

With respect to the face pattern P that is displayed on the display part 6 by the projector 4, a shape of a boundary line (also including outlines of eyes, a mouth, and the like) of the face pattern P is continuously changed in a wave form. The boundary line of the face pattern P continuously moves as a traveling wave having a predetermined frequency (first frequency).

When a predetermined signal (for example, a signal indicating facing a person) is input from the analysis apparatus 15, the communication apparatus 1 vibrates or moves the apparatus main body at a predetermined frequency (second frequency). This behavior is performed by the control of the movement device 3 by the controller 5. At this time, the shape of the boundary line of the face pattern P that is displayed on the display part 6 is continuously changed at the predetermined frequency (first frequency) as described above, and the frequency (second frequency) of the variation (vibration or movement) of the communication apparatus 1 is set to be lower than the frequency (first frequency) of the shape change of the boundary line.

Figure 10:
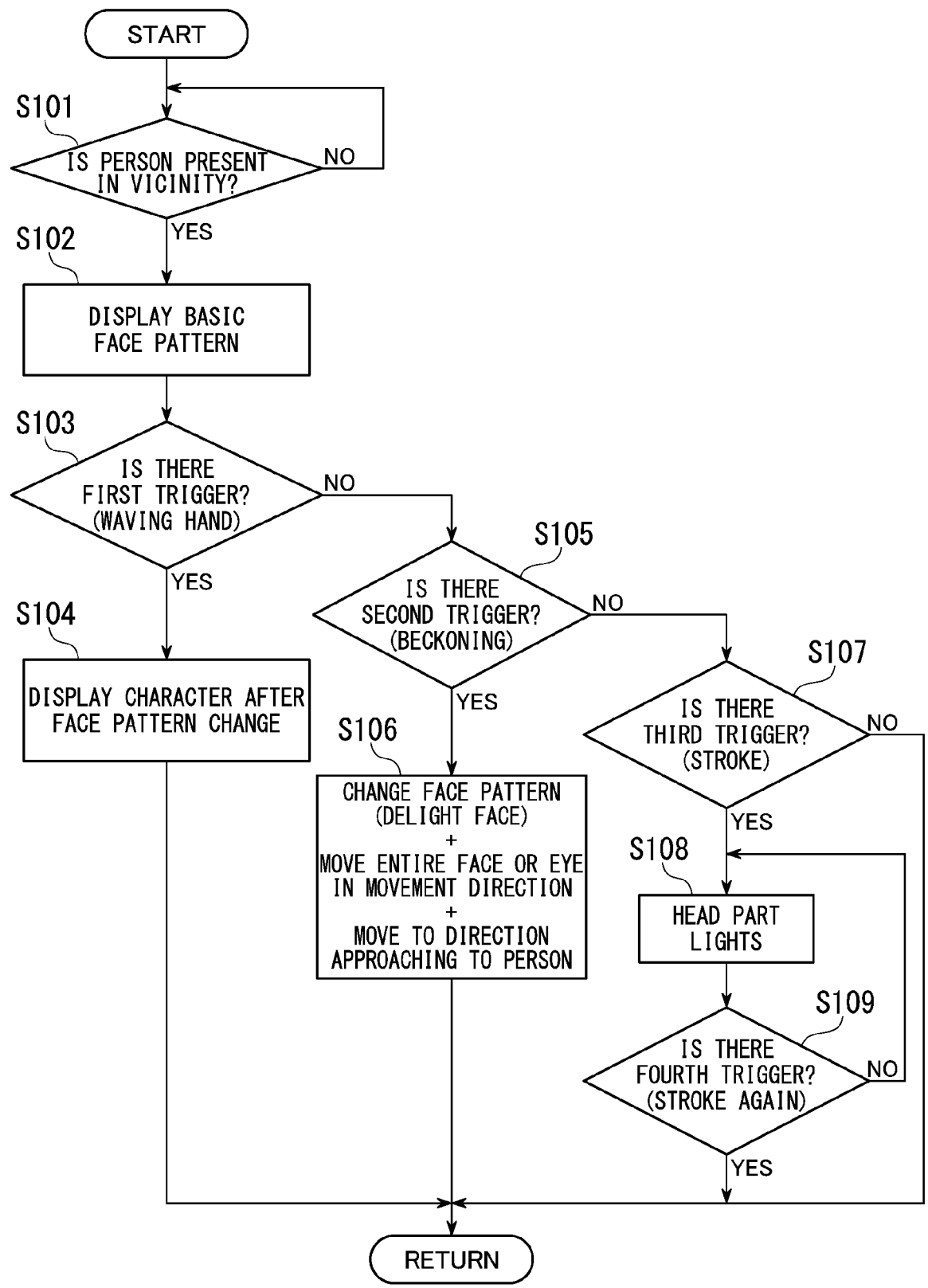
FIG. 10 is a flowchart showing a control flow of the communication apparatus according to the embodiment.

Next, an example of a control of the communication apparatus 1 by the controller 5 is described with reference to a flowchart of FIG. 10.

In Step S101, it is determined whether or not a person is present around the communication apparatus 1 on the basis of an input signal from the analysis apparatus 15. When it is determined that a person is present around the communication apparatus 1, the routine proceeds to Step S102. In Step S102, the basic face pattern P is displayed on a front wall of the head part 2b of the housing 2. At this time, at an appropriate timing, the basic face pattern P may be instantly switched to a wink pattern (a pattern in which the eyes are closed shown in FIG. 3A).

Next, in Step S103, it is determined whether or not there is a trigger signal (first trigger) such as a person waving his/her hand from the analysis apparatus 15. At this time, when it is determined that there is a trigger signal, the routine proceeds to Step S104. When it is determined that there is not a trigger signal, the routine proceeds to Step S105.

When proceeding to Step S104, the face pattern P is gradually changed, for example, as shown in FIGS. 7A to 7D, and eventually, a character, a symbol, or the like such as "Hello" is displayed on the display part 6.

In Step S105, it is determined whether or not there is a trigger signal (second trigger) such as a person beckoning from the analysis apparatus 15. At this time, when it is determined that there is a trigger signal, the routine proceeds to Step S106. When it is determined that there is not a trigger signal, the routine proceeds to Step S107.

Figure 3A:
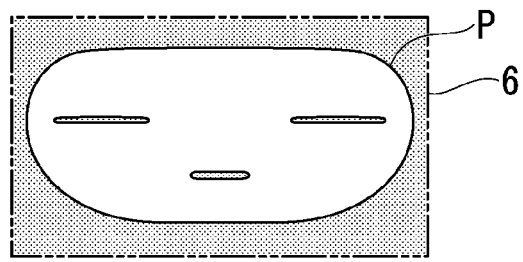
FIG. 3A is a view showing a variation of a face pattern of the communication apparatus according to the embodiment.
Figure 3B:
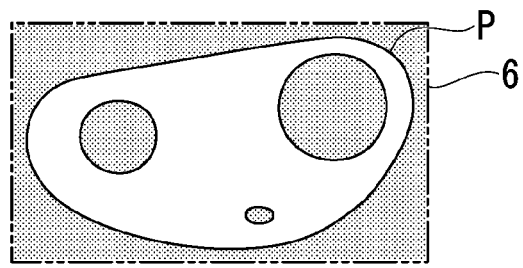
FIG. 3B is a view showing a variation of the face pattern of the communication apparatus according to the embodiment.
Figure 3C:
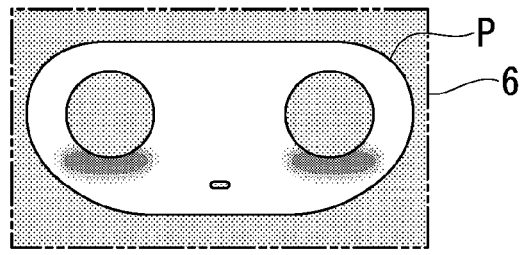
FIG. 3C is a view showing a variation of the face pattern of the communication apparatus according to the embodiment.
Figure 3D:
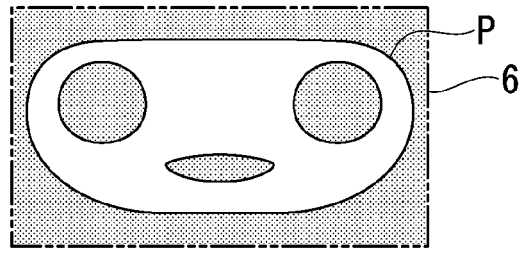
FIG. 3D is a view showing a variation of the face pattern of the communication apparatus according to the embodiment.
Figure 3E:
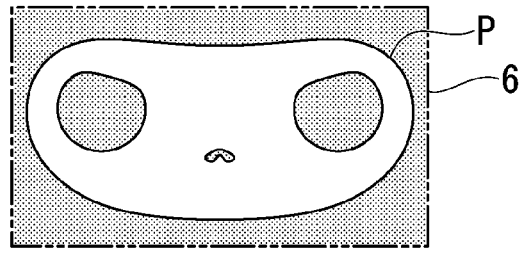
FIG. 3E is a view showing a variation of the face pattern of the communication apparatus according to the embodiment.
Figure 3F:
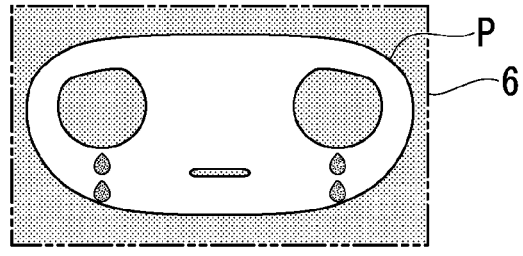
FIG. 3F is a view showing a variation of the face pattern of the communication apparatus according to the embodiment.

When the routine proceeds to Step S106, after the face pattern P is changed to a face of expression of delight, for example, as shown in FIG. 3D, the entire face or only the eye is moved to a direction of the person who beckons, and then, the apparatus main body of the communication apparatus 1 is moved to the direction of the person who beckons.

In Step S107, it is determined whether or not there is a trigger signal (third trigger) such as a person stroking the head part 2b from the analysis apparatus 15. At this time, when it is determined that there is a trigger signal, the routine proceeds to Step S108. When it is determined that there is not a trigger signal, the routine returns to Step S101. In Step S108, the projector 4 is stopped, and the lighting body 20 is turned on. Thereby, as shown in FIG. 8, the head part 2b emits light.

In Step S109, it is determined whether or not there is a trigger signal (fourth trigger) such as a person stroking the head part again from the analysis apparatus 15. At this time, when it is determined that there is a trigger signal, the routine returns to Step S101. When it is determined that a person is present in the vicinity in Step S101, the routine proceeds to the next Step S102 and displays the basic face pattern P on the display part 6 again.

As described above, the communication apparatus 1 of the present embodiment has a configuration in which the controller 5 as a control part controls, in accordance with the change of the face pattern P which is output by the projector 4, a different operation of the apparatus main body than the change of the face pattern P. That is, in the communication apparatus 1 of the present embodiment, not only the change of the face pattern P but also the different operation of the apparatus main body are controlled in accordance with the change of the face pattern P, and therefore, it is possible to present a wider array of changes of expressions to a neighbor.

Further, the communication apparatus 1 of the present embodiment displays a face pattern that suggests a movement of the apparatus main body (for example, performs a display such that the face itself or the eye is moved) on the display part 6 by the control of the projector 4 by the controller 5 when moving the apparatus main body by the movement device 3. Therefore, before the apparatus main body moves, when the apparatus main body moves, or the like, it is possible to allow a neighbor to know the start of the movement, a movement direction, and the like of the apparatus main body by the display of the face pattern P. Specifically, in a case where, before the apparatus main body starts a movement, the start of the movement of the apparatus main body is suggested by the display of the face pattern P, it is possible to alert a neighbor person.

Further, when moving the apparatus main body in the direction that is suggested by the face pattern P, the communication apparatus 1 of the present embodiment tilts the head part 2b downward in the movement direction of the apparatus main body and then moves the apparatus main body by the control by the controller 5. Therefore, in the communication apparatus 1 of the present embodiment, by the tilt of the head part 2b in addition to the face pattern P, it is possible to allow a neighbor to know the start of the movement and the movement direction of the apparatus main body.

Further, in the communication apparatus 1 of the present embodiment, when there is a predetermined trigger such as a person waving his/her hand, the display of the display part 6 is changed from the face pattern to a character or a symbol by the control by the controller 5. A part of the head part 2b at which the face pattern P is displayed easily catches a neighbor person's eye. In the communication apparatus 1 of the present embodiment, the face pattern P that catches the eyes of persons is changed to the character or the symbol, and therefore, it is possible to reliably communicate the intention which the communication apparatus 1 wants to express to the neighbor person as the character or the symbol.

Specifically, in the communication apparatus 1 of the present embodiment, when there is a predetermined trigger, the display of the display part 6 is changed from the face pattern P continuously to the shape of a character or a symbol, and therefore, it is possible to attract further attention from the neighbor. Therefore, it is possible to reliably communicate the intention which the communication apparatus 1 wants to express to the neighbor person.

Further, in the communication apparatus 1 of the present embodiment, the controller 5 controls the projector 4 to display the face pattern P using the imaging apparatus 14 and the analysis apparatus 15 that function as a peripheral situation acquisition part acquiring information indicating that a person is present in the vicinity as a trigger. Therefore, when a person is present around the apparatus main body, it is possible to change the display of the display part 6 from the face pattern P to the character or the symbol. Accordingly, in the communication apparatus 1 of the present embodiment, it is possible to favorably communicate the intention which the communication apparatus 1 wants to express to the neighbor person.

Further, the communication apparatus 1 of the present embodiment changes the display by the projector 4 from the face pattern P to the character or the symbol using the imaging apparatus 14 and the analysis apparatus 15 that function as a motion detection part detecting a predetermined motion of a person as a trigger. Therefore, in the communication apparatus 1 of the present embodiment, it is possible to further favorably communicate the intention which the communication apparatus 1 wants to express, to the person who performs the predetermined motion to the apparatus main body.

Further, in the communication apparatus 1 of the present embodiment, a state where the face pattern P is displayed on the display part 6 is switched to light emission (lighting of the lighting body 20) of the entire head part 2b using the imaging apparatus 14 and the analysis apparatus 15 that function as the motion detection part detecting a predetermined motion of a person with respect to the communication apparatus main body as a trigger. When the face pattern P is displayed on the head part 2b for a long time, a person near the communication apparatus 1 may have a false feeling as if being gazed at by the communication apparatus 1. In such a case, by performing a motion that becomes a trigger such as stroking the head part 2b to the apparatus main body, it is possible to switch the face pattern P to light emission of the entire head part 2b and to allow the communication apparatus 1 to function as an illumination. As a result, by lighting the head part 2b of the communication apparatus 1, it becomes possible to blend the communication apparatus 1 with the peripheral space as one of interior accessories.

Further, in the case of the communication apparatus 1 of the present embodiment, the display of the pattern P is controlled by the controller 5 such that the shape of the boundary line of the face pattern P is changed in a wave form at a predetermined frequency (first frequency). Therefore, by the continuous change of the boundary line of the pattern P, it is possible to allow a neighbor person to evoke that the communication apparatus 1 is a communication target.

Further, in the communication apparatus 1 of the present embodiment, the movement device 3 is controlled by the controller 5 such that the apparatus main body vibrates or moves at a predetermined frequency (second frequency). Therefore, by the periodic and continuous motion of the apparatus main body, it is possible to allow a neighbor person to evoke that the communication apparatus 1 is a communication target.

Specifically, in the case of the communication apparatus 1 of the present embodiment, the controller 5 performs a control such that the periodic motion of the apparatus main body is interlocked with the shape change in a wave form of the boundary line of the face pattern P. Therefore, it is possible to allow a neighbor person to further strongly evoke that the communication apparatus 1 is a communication target.

Further, in the communication apparatus 1 of the present embodiment, the operation frequency (second frequency) of the apparatus main body is set to be lower than the frequency (first frequency) of the shape change of the boundary line of the face pattern P. Therefore, the motion of the apparatus main body is relatively slow with respect to the motion of the boundary line of the face pattern P. Accordingly, it is possible to prevent a neighbor person who sees the communication apparatus 1 from being irritated.

Further, in the communication apparatus 1 of the present embodiment, at a predetermined condition (for example, when a neighbor person beckons, and information indicating the motion is input to the controller 5), the display position of the face pattern P in the display part 6 is moved by the control of the controller 5. Therefore, without actually moving the head part 2b of the apparatus main body, it is possible to show as if the head part 2b is moved to a neighbor. Accordingly, in the communication apparatus 1 of the present embodiment, it is possible to allow the communication apparatus 1 to perform a variety of motions in appearance while simplifying the system.

The present invention is not limited to the embodiment described above, and a variety of design changes can be made without departing from the scope of the invention. For example, in the embodiment described above, the projector 4 is employed as the display output part capable of outputting the face pattern to the display part; however, the display output part is not limited to the projector 4. For example, the display output part may be constituted of a liquid crystal display, an organic light-emitting display, or the like.

The invention claimed is:

1. A communication apparatus, comprising:
   a display device on which a plurality of face patterns are switched and displayed; and
   a processor configured to:
   output, to the display device, a face pattern of the plurality of face patterns; and
   control, in accordance with a change of the face pattern, a different operation of a communication apparatus main body based on the change of the face pattern, wherein the communication apparatus main body comprises a movement device comprising a first wheel of a first diameter and a second wheel of a second diameter, wherein the first diameter is larger than the second diameter, and wherein the first wheel facilitates translation movement of the communication apparatus main body and the second wheel facilitates rotation movement of the communication apparatus main body,
   wherein in response to detecting a predetermined trigger, the face pattern transitions from the face pattern to the face pattern wherein a boundary line of the face pattern is represented as a traveling wave performed at a defined frequency, then transitions to a cloud shaped pattern, and then the cloud shaped pattern transitions to a symbol of a plurality of symbols, wherein each of the face pattern transitions represent a defined emotion determined in response to an interaction with a user entity.

2. The communication apparatus according to claim 1, wherein the processor is further configured to:
   cause the communication apparatus main body to move via the movement device, and
   in response to the communication main body being moved, output, to the display device, a face pattern representing a movement among the plurality of face patterns.

3. The communication apparatus according to claim 2, wherein the processor is further configured to:
   in response to a movement direction being displayed to the display device, move the communication apparatus main body, via use of the movement device, in a direction representative of the face pattern.

4. The communication apparatus according to claim 3, wherein the communication apparatus main body has a head part above the movement device, and
   when the communication apparatus main body is being moved in the direction that is suggested by the face pattern, the processor causes the head part to tilt downward in the movement direction of the communication apparatus main body and then moves the communication apparatus main body.

5. The communication apparatus according to claim 1, wherein the processor is further configured to control the display device such that after an occurrence of the predetermined trigger, the face pattern that is displayed on the display device is changed to a character.

6. The communication apparatus according to claim 5, wherein the processor is further configured to control the display device such that after there is the predetermined trigger, the face pattern that is displayed on the display device is continuously changed to a shape of the character or the symbol.

7. The communication apparatus according to claim 5, wherein the processor is further configured to:
   acquire a peripheral situation of the communication apparatus main body, and
   control the display device based on the peripheral situation indicating that a person is present in a vicinity of the communication apparatus main body, wherein the peripheral situation is used as the predetermined trigger.

8. The communication apparatus according to claim 5, wherein the processor is further configured to:
   detect a motion of a person with respect to the communication apparatus main body, and
   control the display device based on detecting a predetermined motion of a person with respect to the communication apparatus main body, wherein the predetermined motion is the predetermined trigger.

9. The communication apparatus according to claim 1, wherein the processor is further configured to:
   detect a motion of a person with respect to the communication apparatus main body; and
   illuminate a region which includes the display device of the communication apparatus main body,
   wherein the processor changes a display of the face pattern to light emission based on detecting a predetermined motion of a person with respect to the communication apparatus main body, wherein the predetermined motions is a trigger.

10. The communication apparatus according to claim 1, wherein the processor is further configured to control the display device such that a shape of the boundary line of the face pattern is changed in a wave form at a first frequency.

11. The communication apparatus according to claim 10, wherein the processor is further configured to:
    move the communication apparatus main body,
    wherein the processor causes the communication apparatus main body to vibrate or move at a second frequency together with a shape change in the wave form of the boundary line of the face pattern.

12. The communication apparatus according to claim 11, wherein the second frequency is set to be lower than the first frequency.

13. The communication apparatus according to claim 1, wherein the processor is further configured to:

move the communication apparatus main body,
wherein the processor causes the communication apparatus main body to vibrate or move at a second frequency.

14. The communication apparatus according to claim 1, wherein the processor causes the display device to move a display position of the face pattern in the display device based on a predetermined condition.

15. A communication apparatus operation method, comprising:
displaying a face pattern of a plurality of face patterns on a display device of a communication apparatus main body; and
in accordance with a change of the face pattern, performing a different operation of the communication apparatus main body based on the change of the face pattern, wherein the communication apparatus main body comprises a movement device comprising a first wheel of a first diameter and a second wheel of a second diameter, wherein the first diameter is larger than the second diameter, and wherein the first wheel facilitates translation movement of the communication apparatus main body and the second wheel facilitates rotation movement of the communication apparatus main body,
wherein in response to detecting a predetermined trigger, the face pattern transitions from the face pattern to the face pattern wherein a boundary line of the face pattern is represented as a traveling wave performed at a define frequency, the transitioned to a cloud shaped pattern, and then the cloud shaped pattern transitions to a symbol of a plurality of symbols, wherein each of the face pattern transitions represents an emotion determined in response to an interaction with a user entity.

16. The communication apparatus operation method according to claim 15, wherein the face pattern is a first face pattern, and wherein a second face pattern that suggests a movement is displayed on the display device when the communication apparatus main body is moved.

17. The communication apparatus operation method according to claim 15,
wherein the face pattern displayed to the display device is changed to a character when there is the predetermined trigger.

18. A communication apparatus, comprising:
a display device on which a plurality of face patterns are switched and displayed; and
a processing circuit the executes instructions to perform operations, comprising:
outputting a face pattern to the display device;
moving a communication apparatus main body; and
controlling the display device and the communication apparatus main body,
wherein the controlling the display device comprises that when the communication apparatus main body is moved, the face pattern that suggests a movement among the plurality of face patterns is displayed on the display device,
when the display device is displaying the face pattern that suggests a movement direction, the communication apparatus main body moves in the movement direction that is suggested by the face pattern, and
in response to detecting a predetermined trigger, the face pattern transitions from the face pattern to the face pattern wherein a boundary line of the face pattern is represented as a traveling wave performed at a define frequency, the transitions to a cloud shaped pattern, and then the cloud shaped pattern transitions to a symbol of a plurality of symbols, wherein each of the face patterns transitions represent a defined emotion determined in response to an interaction with a user entity.

* * * * *